US012304342B2

(12) United States Patent
McCloskey (10) Patent No.: US 12,304,342 B2
(45) Date of Patent: May 20, 2025

(54) MANAGING ELECTRIC VEHICLE CHARGING THROUGH A SMART METER

(71) Applicant: San Diego Gas & Electric Company, San Diego, CA (US)

(72) Inventor: James McCloskey, San Diego, CA (US)

(73) Assignee: San Diego Gas & Electric Company, San Diego, CA (US)

( * ) Notice: Subject to any disclaimer, the term of this patent is extended or adjusted under 35 U.S.C. 154(b) by 571 days.

(21) Appl. No.: 17/468,513

(22) Filed: Sep. 7, 2021

(65) Prior Publication Data

US 2023/0071205 A1 Mar. 9, 2023

(51) Int. Cl.
*B60L 53/64* (2019.01)
*B60L 53/66* (2019.01)
*B60L 53/67* (2019.01)
*B60L 53/68* (2019.01)

(52) U.S. Cl.
CPC ............. *B60L 53/64* (2019.02); *B60L 53/665* (2019.02); *B60L 53/67* (2019.02); *B60L 53/68* (2019.02); *B60L 2250/16* (2013.01)

(58) Field of Classification Search
CPC ........ B60L 53/64; B60L 53/665; B60L 53/67; B60L 53/68; B60L 2250/16
See application file for complete search history.

(56) References Cited

U.S. PATENT DOCUMENTS

| 2008/0039979 | A1* | 2/2008 | Bridges | B60L 55/00 700/286 |
| 2010/0017249 | A1* | 1/2010 | Fincham | H02J 7/1446 320/108 |
| 2012/0253567 | A1* | 10/2012 | Levy | B60L 53/63 701/22 |

\* cited by examiner

*Primary Examiner* — David V Henze-Gongola
(74) *Attorney, Agent, or Firm* — Sheppard Mullin Richter & Hampton LLP (57) ABSTRACT

A system and method for remotely managing electric power transfer comprising a power source, an electric vehicle charging device configured to transfer electric power from the power source to an electric vehicle, and a smart meter device coupled to the charging device on one end and the power source on another end. The smart meter device is configured to control the electric power transferred by the electric vehicle charging device (EVSE) is provided.

16 Claims, 12 Drawing Sheets

Power Your Drive Connect                                  Welcome User

⌂ Home
◉ Charger Map
⤳ My Sessions

My Sessions

Filter _______ ×   [Clear Filters]

▤ My Bill
$ Hourly Pricing
◉ My Profile

| Vehicle | Vehicle Type | Station | Start | End | Duration (hours) | kWh |
|---|---|---|---|---|---|---|
| Car | Volkswagen e-Golf | EG2 | 05/05/21 12:06 PM | 05/05/21 12:06 PM | 0.01 | 0 |
| Car | Volkswagen e-Golf | GC4 | 05/03/21 11:26 AM | 05/03/21 11:26 AM | 0.01 | 1 |
| E2039 | Mitsubishi Outlander PHEV | Eg2 | 04/30/21 10:42 AM | 04/30/21 10:47 AM | 0.08 | 0 |
| E2039 | Mitsubishi Outlander PHEV | GC3 | 04/26/21 02:44 PM | 04/26/21 02:47 PM | 0.04 | 182 |
| A0002 | Chevrolet Bolt EV | GC3 | 04/26/21 02:35 PM | 04/26/21 02:38 PM | 0.06 | 90 |
| Car | Volkswagen e-Golf | GC3 | 04/22/21 03:37 PM | 04/22/21 03:37 PM | 0.16 | 466 |

Items per page  10 ▾    1 - 6 of 6   |< < > >|

MANAGING ELECTRIC VEHICLE CHARGING THROUGH A SMART METER

TECHNICAL FIELD

This disclosure relates generally to electrical components, and more specifically to electrical installations to allow for the remote control via utility smart meters of electric vehicle charging stations from the power grid.

BACKGROUND

As more consumers adopt electric vehicles (EVs), the need for vehicle charging facilities grows. Electric vehicles include battery-electric and plug-in hybrid vehicles, each of which are charged from an external power source through electric vehicle supply equipment (EVSE), also referred to as charging stations.

Entities like workplaces or corporate fleet operators may install charging stations in private settings for use by employee or fleet vehicles. These entities are referred to as Charging Site Operators and may own the EVSE, or the EVSE may be owned and operated by third parties. EVSE operators require an efficient means to manage charging power and bill drivers.

BRIEF SUMMARY OF EMBODIMENTS

The disclosed technology describes a system that allows remote control of vehicle charging at EVSE using smart meter technology, referred to as Smart Meter Control. The disclosed technology enables management of EV charging by utilizing the remote connect/disconnect capabilities of utility smart meters. Vehicle users are able to control vehicle charging through a mobile computing device.

In some embodiments, a system and method for remotely managing electric power transfer comprising a power source, an electric vehicle charging device configured to transfer electric power from the power source to an electric vehicle, and a smart meter device coupled to the charging device on one end and the power source on another end is provided. The smart meter device is configured to control the electric power.

In some embodiments, the smart meter device is configured to communicate with a smart meter control server via a smart meter network and one or more user mobile devices through a mobile network. In some embodiments, the smart meter device is configured receive a user command from a mobile device operated by a user via the mobile network.

In some embodiments, the smart meter device controls the electric power transferred by the electric vehicle charging device by transmitting a control command to the smart meter control server via the smart meter network.

In some embodiments, upon receiving the user command from the user operated mobile device to begin charging the electric vehicle, the smart meter device transmits the control command to the smart meter control server to begin the electric power flow. Alternatively, upon receiving the user command from the user operated mobile device to stop charging the electric vehicle, the smart meter device transmits the control command to the smart meter control server to stop the electric power flow. In some embodiments, the smart meter is configured to obtain electric power consumption information from the smart meter control server. In some embodiments, the system comprises a data control unit configured to determine a total cost for charging the electric vehicle based on the electric power consumption information obtained from the smart meter control server.

Additional features and aspects of the invention will be described from the following detailed narrative in conjunction with the accompanying drawings, which illustrate by way of example the features in accordance with embodiments of the invention. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or exemplify embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIGS. 8A-10B illustrate an example mobile application configured for personal user access when charging a vehicle of the example system of FIG. 1, in accordance with embodiments disclosed herein.

The figures are not intended to be exhaustive or to limit the invention to the precise form disclosed. The figures are not drawn to scale. It should be understood that the disclosed technology can be practiced with modification and alteration, and that the disclosed technology be limited only by the claims and the equivalents thereof.

DETAILED DESCRIPTION OF THE EMBODIMENTS

As EV adoption increases, a growing number of Charging Site Operators are installing EVSE. Charging Site Operators require the ability to control vehicle charging. This control may entail managing access, staggering vehicle charging to manage peak electrical load of the site, or providing billing to individual drivers. All of these services require curtailing electricity flow from the power grid to the EVSE and enabling this flow in specific circumstances. Charging Site Operators may install EV charging in public or private settings; examples of private EV charging installations include workplaces installing charging intended only to serve employees or corporate or governmental vehicle fleet operators.

Private Charging Site Operators face a unique set of challenges related to access, control of power supply, and billing. Charging Site Operators may require the ability to manage large numbers of chargers at a single site. Unlike third-party operated public charging networks, private Charging Site Operators may not want to bill individual drivers (for example, the drivers of shared corporate fleet vehicles) at the moment when charging is completed.

There are several existing methods for controlling EV charging in private settings. Some EVSE manufacturers and operators utilize a central hardware control unit (e.g., the Hydra unit utilized by Liberty Access Technologies) to control the power flow to the charging stations. The central hardware control unit may include several meters configured to collect power consumption data for individual EVSE connected to the control unit. Drivers can use a pin pad that is hard-wired to the control unit in order to turn on and off charging stations.

Other EVSE manufacturers and operators build the meter and control unit directly in to the EVSE. These EVSEs may be network-connected and communicate with a remote server via communication link over cellular network, e.g., a local area network (LAN) (e.g., LAN may be a wireless local area network (WLAN) or a powerline communication network). The command to enable or disable charging may be sent over the network, which allows the EV operator to connect to the EVSE through a mobile communication device over WLAN or a wireless personal network (WPAN). This allows the Charging Site Operator to access and monitor power consumption by the EV remotely, with data stored on a remote server. While the EVSE may be controlled remotely over a cellular network, not all private Charging Site Operators have access to this level of control and instead are reliant on third-party software solutions.

EVSE control though WLAN networks can create several inconveniences for private Charging Site Operators. Third-party network operators may provide inaccurate and/or incomplete data to EVSE operators, complicating billing or power management. Charging Site Operators typically also must pay for the networking costs associated with managing WLAN networks, which may include both direct data fees and overhead costs from the network operator. Tracking and/or authorizing vehicle charging by specific vehicle users typically requires users to provide account information each time they charge, often via a mobile application password, key access with a password, or an RFID chip card. Accordingly, the control of and data management associated with individual stations either through a pin pad (i.e., hardwired) or remotely (i.e., over WLAN) by the Charging Site Operator is cumbersome, ineffective, and costly.

The Smart Meter Control technology described in this application improves upon existing methods of controlling EV charging in private settings by improving data access and control by the EVSE operator without the need for a third-party managed network. In this embodiment a single utility smart meter is installed between the power source and a single EVSE. This one-to-one configuration between the smart meter and the EVSE allows the Charging Site Operator to manage charging at each individual EVSE by using the smart meter remote connect/disconnect ability. By curtailing power flow at the smart meter rather than EVSE the Charging Site Operator can collect charging data associated with each individual charging station through the smart meter, avoiding relying on an internal meter within the EVSE. Administering charging and collecting data through the smart meter rather than an internal EVSE meter is expected to improve data quality and simplify control.

Figure 1:
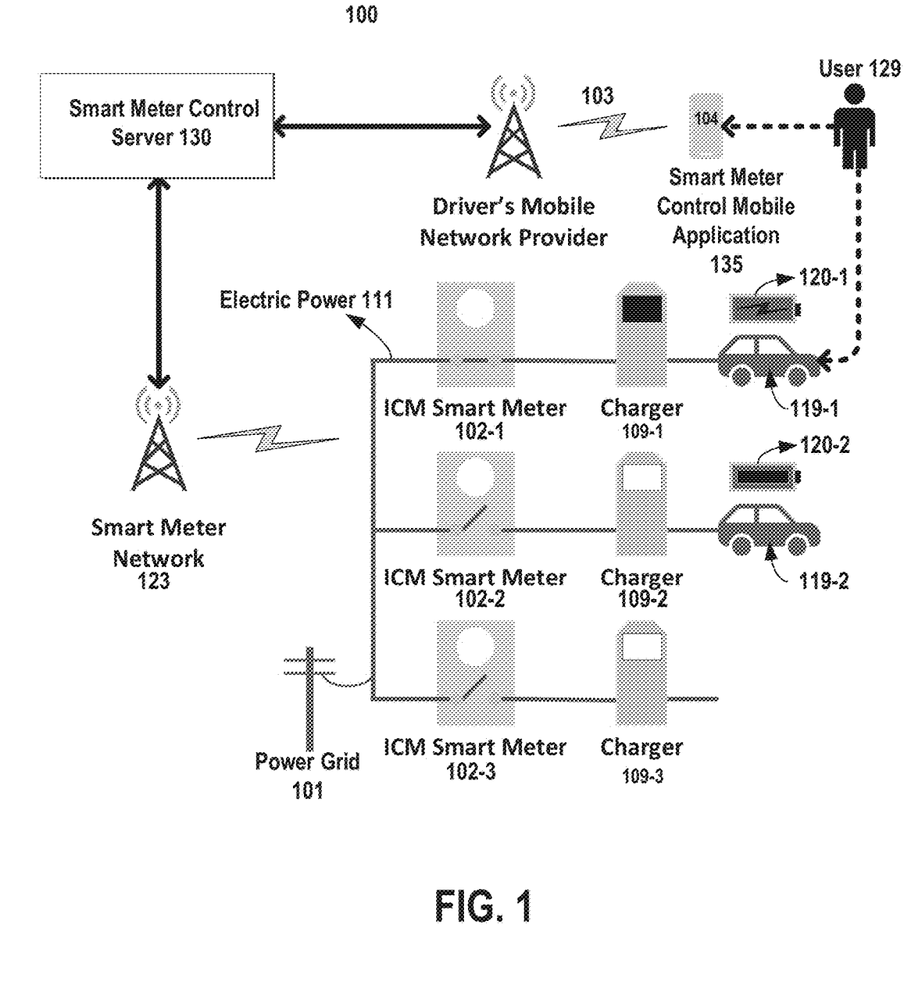
FIG. 1 shows an EV charging installation where charging is controlled by utility smart meters, dispatched through the smart meter network in accordance with the embodiments disclosed herein.

FIG. 1 is a diagram illustrating Smart Meter Control of an EV charging site, referred to as system 100. In some embodiments, system 100 comprises an ICM Smart Meter 102, a charging device 109 (i.e., EVSE), a power distribution grid 101, a Smart Meter network 123, and a server 130. Power distribution grid 101 is the electrical supply grid owned and operated by a local utility company. As illustrated, ICM Smart Meter 102 connects charging device 109 to power grid 101. In essence, the ICM Smart Meter is installed with each charging device (as illustrated, ICM Smart Meter 102, 102-1, 102-2 is installed with each charging device 109, 109-2, 109-2, respectively). By using the ICM Smart Meter 102 to connect charging device 109 to the power distribution grid 101, the Charging Site Operator is able to control power flow to charging device 109 by using the existing remote disconnect and reconnect commands associated with ICM Smart Meter 102.

Further, as illustrated, vehicle operator 129 brings vehicle 119 to charge vehicle battery 120 at charging device 109. User 129 uses the mobile application 135 installed on their mobile computing device 104 to manage the power transfer from power grid 101 to vehicle 119 by plugging a charging cable associated with charging station 109 to vehicle 119. Once the server 130 authenticates user 129 the ICM Smart meter 102 is reconnected and power is transferred from the power grid 101 to vehicle 119. Upon reaching a particular charging threshold, exhausting charging time allotted, or direct charging session termination by user 129, the power flow is disconnected by having the server 130 send a remote disconnect command to ICM smart meter 102.

The mobile communication device 104, used by the electric vehicle operator 129, can be any type of WLAN or WPAN compatible device. For example, mobile communication device 104 may include a one way and two-way RFID devices, an example of the latter being a FasTrac® card; Wi-Fi® devices, such as a personal computer; BlueTooth® devices, such as a mobile phone; and ZigBee® devices.

In some embodiments, mobile communication device 104 may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices. In some embodiments, mobile communication device 104 may present content to a user and receive user input. In some embodiments, mobile communication device 104 may parse, classify, and otherwise process user input. For example, client computing device 104 may store user input including user access information for authenticating into the user charging application, as will be described in detail below.

In some embodiments, mobile communication device 104 may be equipped with GPS location tracking and may transmit geolocation information via a wireless link and mobile network 125. In some embodiments, server 130 and/or mobile application 135 may use the geolocation information to determine a geographic location associated with user 129. In some embodiments, server 130 may use signal transmitted by mobile communication device 104 to determine the geolocation of user 129 based on one or more of signal strength, GPS, cell tower triangulation, Wi-Fi location, or other input.

Figure 2:
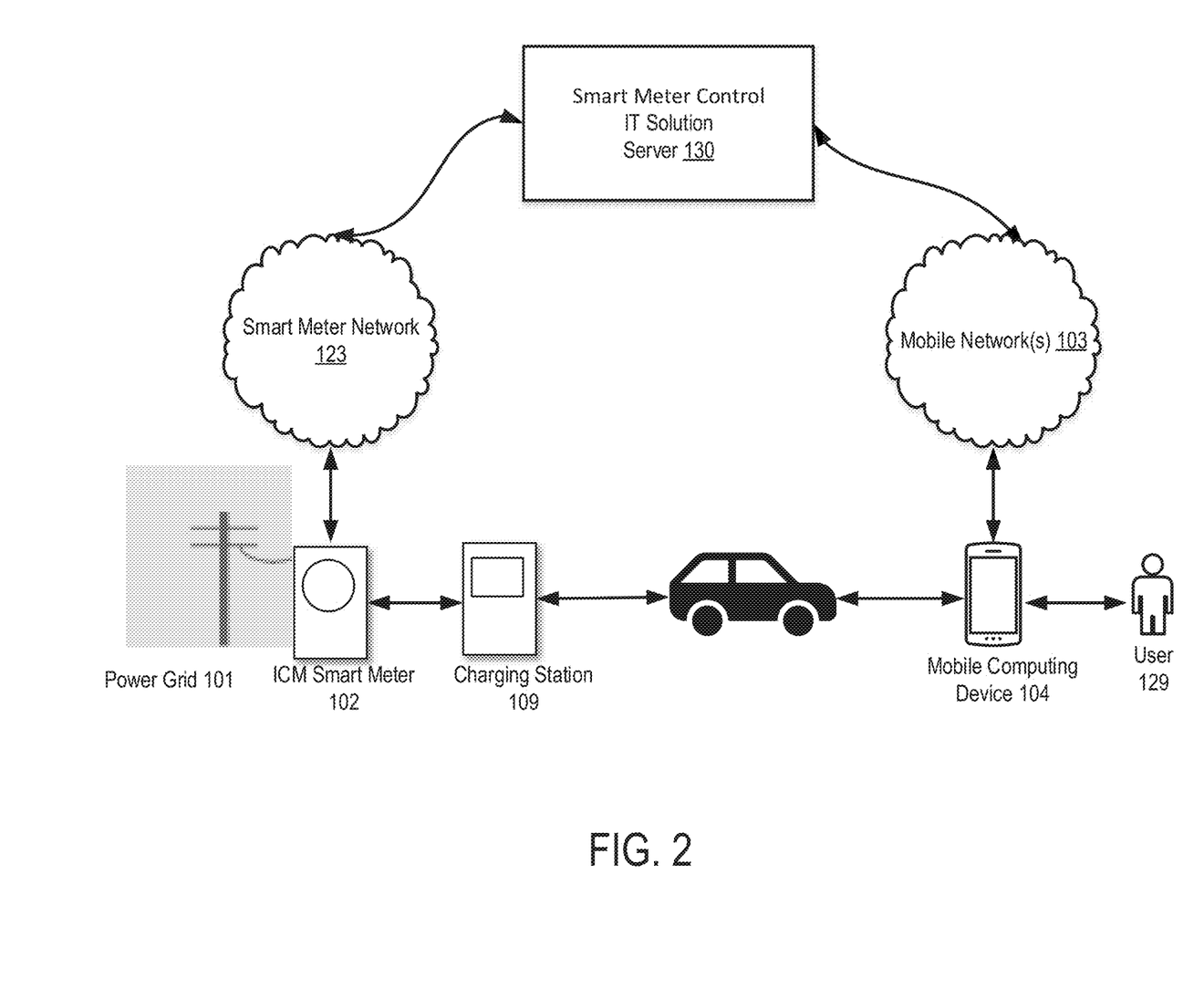
FIG. 2 illustrates an example smart meter control charging system of the example system of FIG. 1, according to an implementation of the disclosure.

For example, as illustrated in FIG. 2, server 130 may be configured to receive data from ICM Smart Meter 102 and mobile computing device 104. As alluded to above, ICM Smart Meter 102, which connects charging device 109 to power grid 101, communicates with server 130 via Smart Meter network 123.

Referring back to FIG. 1, in some embodiments, electrical power may be delivered to the power consuming device (e.g., vehicle 119) via charging device 109, while ICM Smart Meter 102 measures the power consumption of the power consuming device. In some embodiments, ICM Smart Meter 102 may couple the energy charging device 109 to power grid 101 by using a separable connector such as a flexible cable or flexible conduit containing insulated wires.

A number of smart meter devices, such as ICM Smart Meter 102, may couple a number of charging devices 109 to a power grid 101 at a particular location (e.g., an office parking lot). ICM Smart Meter 102 connecting the charging device 109 to the power grid 101 may then be used to gather power consumption information about individual charging stations, as well as to send information or instructions to devices regarding power consumption (e.g., disconnect or reconnect) from a power grid management system (for example, a power utility). In some embodiments, ICM Smart Meter 102 may be configured to communicate with server 130 using the Smart Meter network 123. Server 130 may receive power consumption information and send instructions to control the power to charging station 109 in accordance with instructions stored therein.

By utilizing ICM Smart Meter 102 capabilities to control power consumption, collect power consumption data, and manage user access, the charging device 109 is only used for its power transfer functionality. Conventional charging device must be equipped with separate tools to allow similar capabilities, as previously discussed. However, individual charging device manufacturers may not use consistent features and technology, thus making each charging device installation manufacturer (i.e., hardware) specific. By contrast, by utilizing only the power transfer functionality of the charging device 109, system 100 is hardware agnostic. That is because system 100 can utilize any variety of EVSEs controlled via ICM Smart Meter 102.

In some embodiments, ICM Smart Meter 102 may comprise a measurement module and a communication module. In some embodiments, the measurement module may include a voltage and/or current meter, and/or other electrical measurement devices. The measurement module may also include a processor and a memory module to store voltage, current, and other measurements, and to generate a signal if power flow reaches a predetermined threshold value.

In some embodiments, the measurement module may include a communications module which may transmit the signal to a receiver unit. Alternatively, the communication module may be coupled to the measurement module. For example, the communications module may be logically coupled, via a wire or other harness, to ICM Smart Meter 102. Alternatively, the communications module may transmit a wireless signal via cellular, Wi-Fi, Bluetooth®, Zigbee, or other wireless communications protocol to a remote receiver unit, and ultimately a computer server, workstation, tablet, laptop, handheld or other device. The measurement module may monitor the bidirectional real and reactive power flow through the ICM Smart Meter 102. This measurement data may be provided to a customer (a private charge station provider, vehicle owner 129 and/or a utility company) for monitoring. The communication module may provide the measurement data to a data collection device, including a central server (e.g., server 130) or other data handling medium.

In other embodiments, user 129 can monitor the power flow to vehicle 119 using the mobile application 135 installed on mobile communication device 104. This can be implemented by allowing user 129 access to the data record of the power consumed by the electric vehicle 119, which is monitored by ICM Smart Meter 102 and stored on the server 130.

Figure 3:
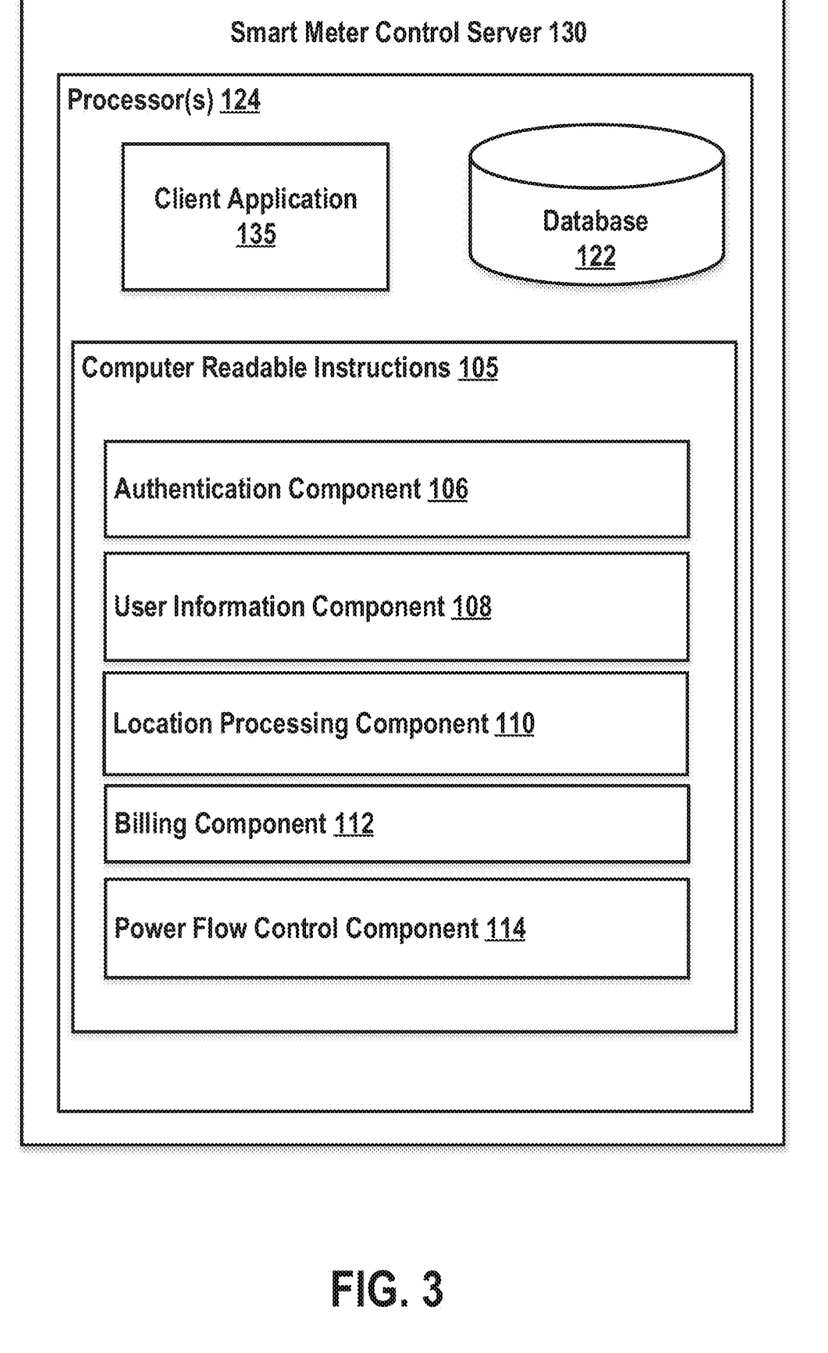
FIG. 3 illustrates an example Smart Meter Control server of the example system of FIG. 1, according to an implementation of the disclosure.
Figure 4:
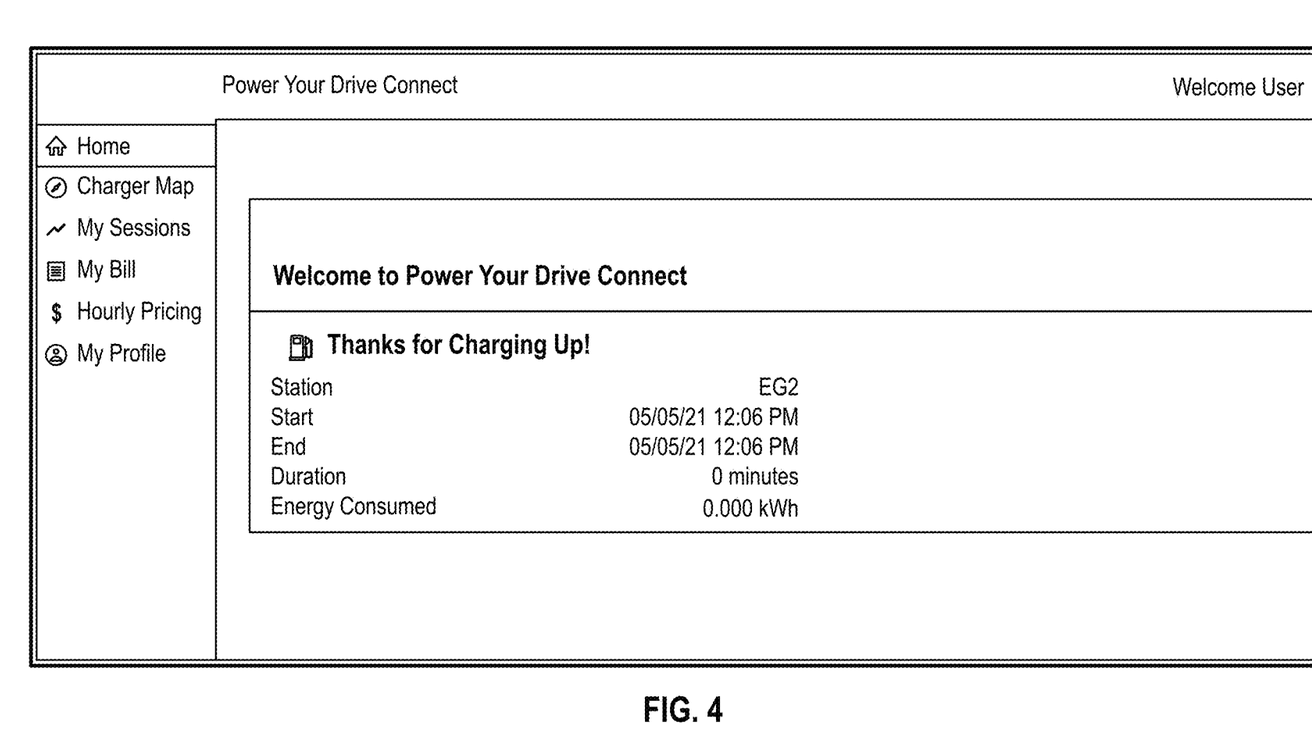
FIGS. 4-6 illustrate example web application screens used by drivers to control vehicle charging in the Smart Meter Control system shown in FIG. 1, in accordance with embodiments disclosed herein.
Figure 5:
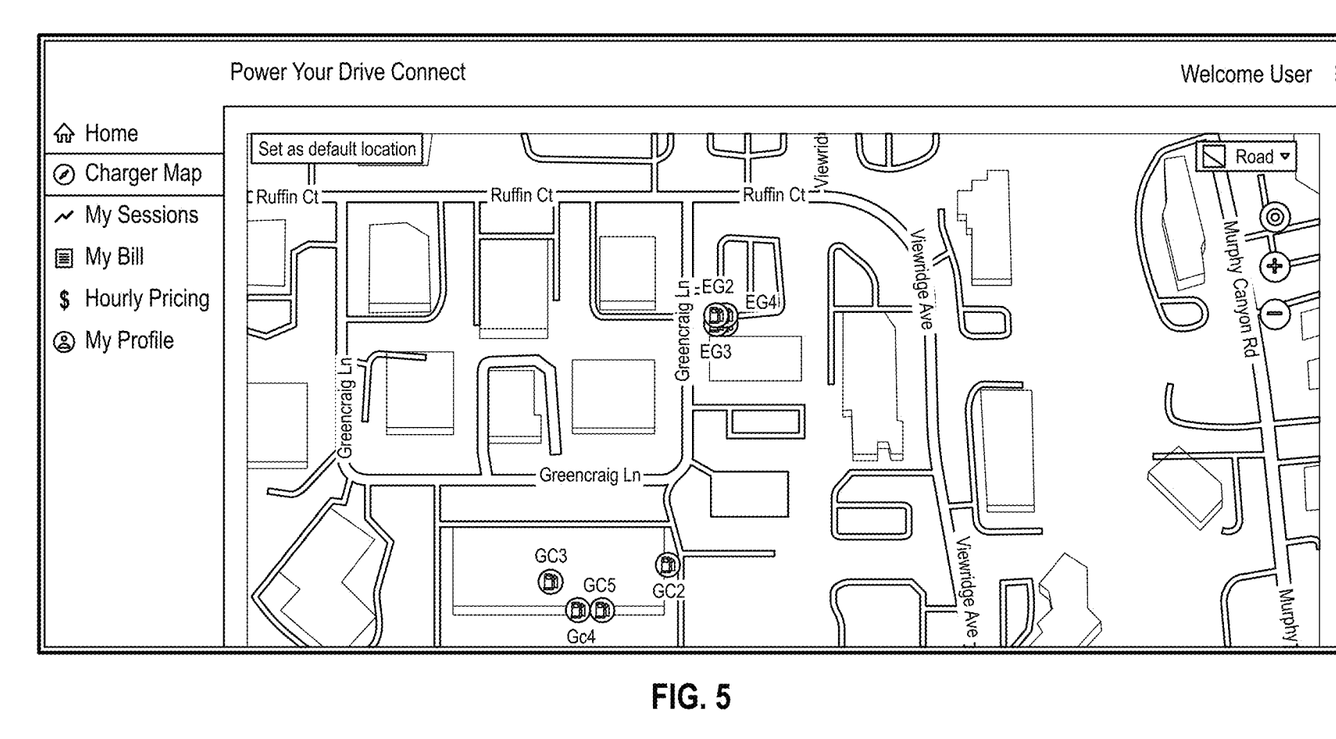

For example, FIG. 3 illustrates Smart Meter Control server 130 of the Smart Meter Control IT Solution configured in accordance with one embodiment. As alluded to above, Smart Meter Control server 130 may include a client application 135 running either a web application (e.g., illustrated in FIGS. 4-7B) or as a mobile application running on mobile computing device 104 (e.g., illustrated in FIGS. 8A-10B).

In some embodiments, client application 135 may be operable by one or more processor(s) 124 configured to execute one or more computer program components. In some embodiments, the computer program components may include one or more of: an authentication component 106, a user information component 108, a location processing component 110, a billing component 112, a power flow control component 114, and/or other such components.

In some embodiments, as alluded to above, authorized user 129 may control their use of charging station 102 via client application 135 which accesses Smart Meter Control server 130. For example, users may first enroll in a workplace or facility charging program with the correct site access code and site ID. Then, users can start charging at that site. Only validated drivers may use client application 135 to start and end charging sessions.

In some embodiments, authentication component 106 may be configured to initiate client application 135 on mobile computing device 104 upon authenticating user 129. For example, authentication component 106 may be configured to process user input comprising username and password.

Figure 7A:
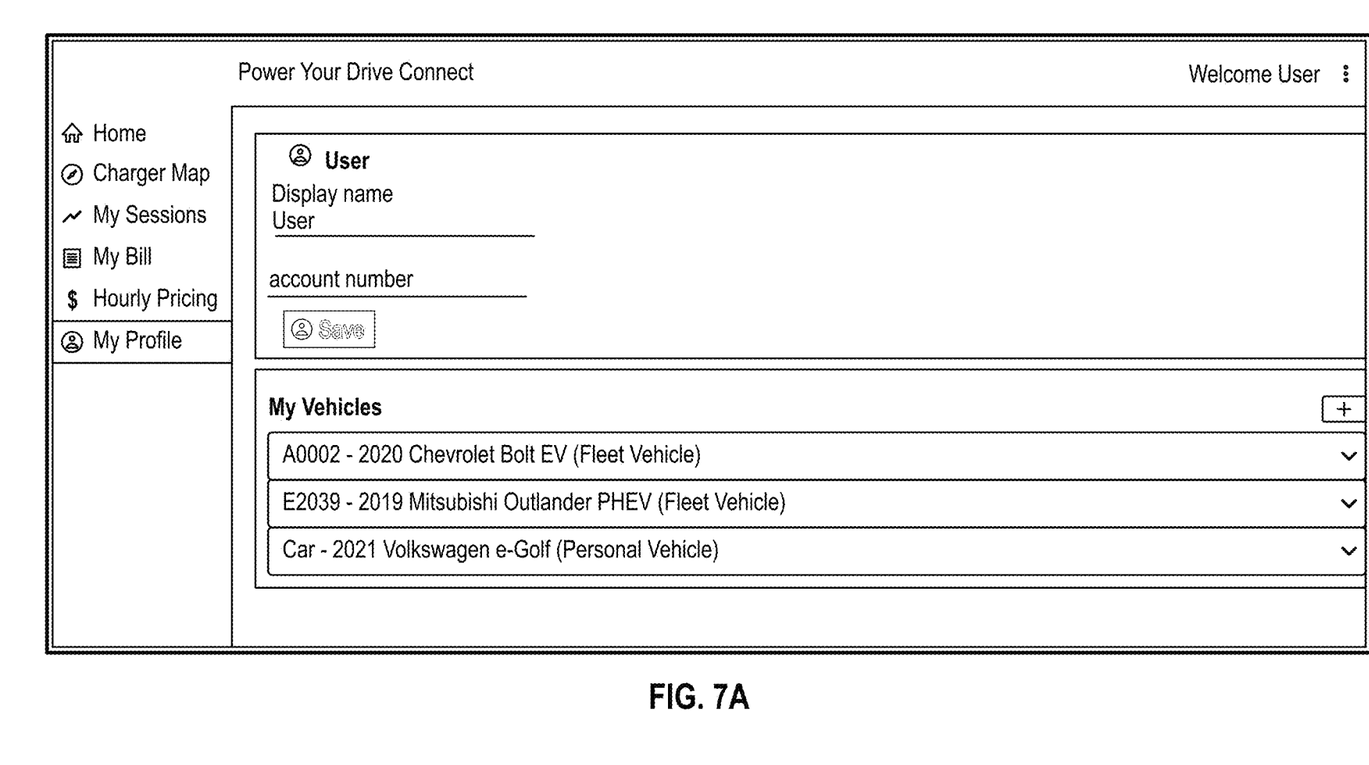
FIGS. 7A-7B illustrate example web application screens for configuring a user account, in accordance with embodiments disclosed herein.
Figure 7B:
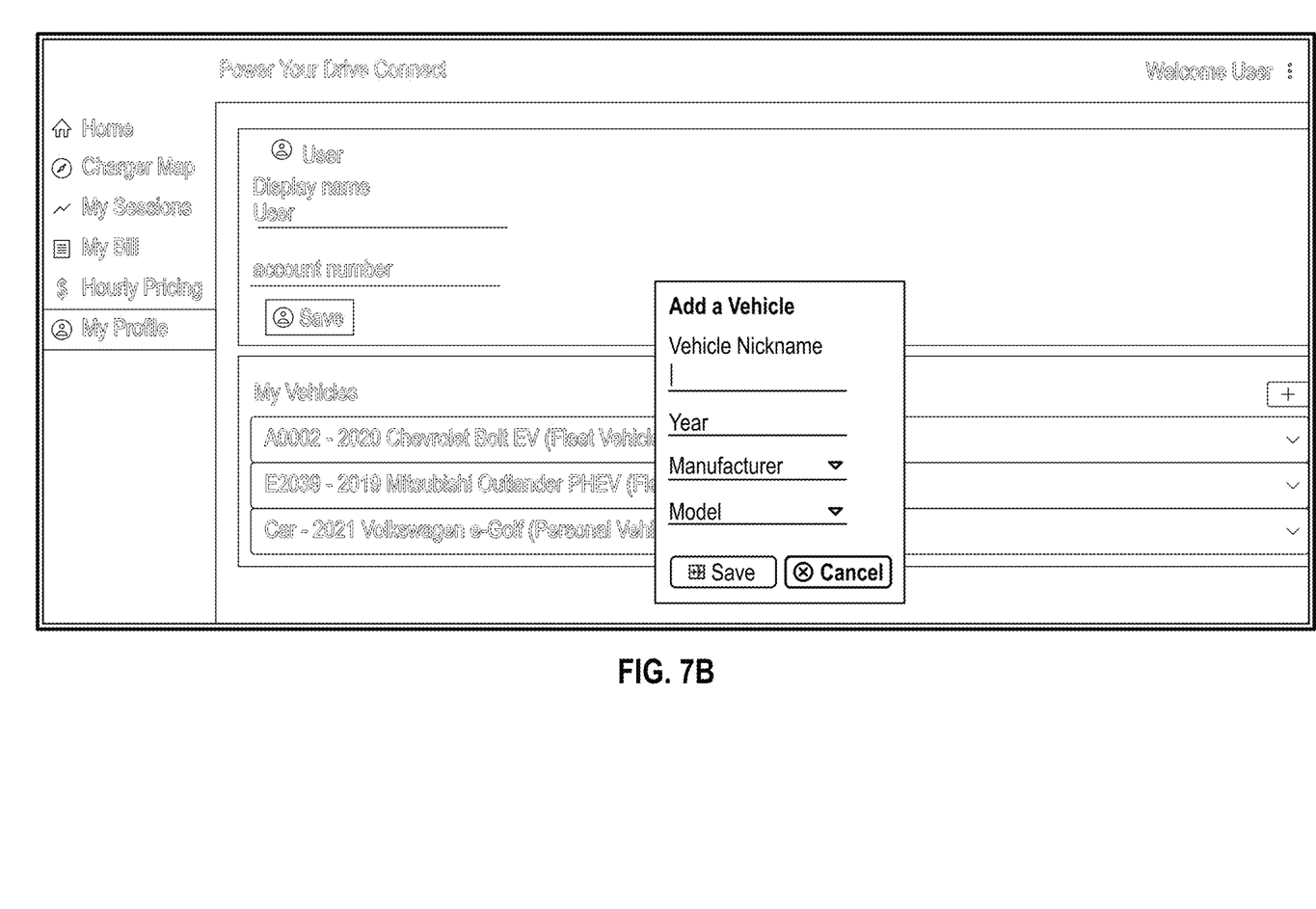
Figure 10A:
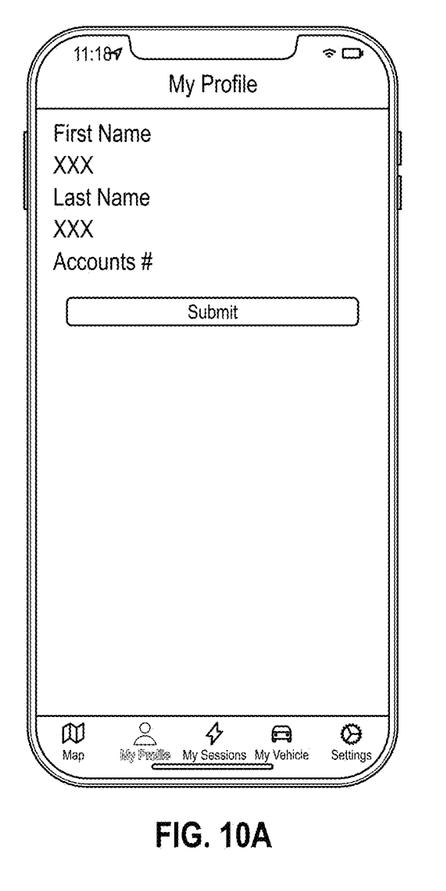

In some embodiments, user information component 108 may be configured to obtain, manage, and store user input associated with user profile. For example, user 129 can input user biometric information, user preference information, name and vehicle information, as illustrated in FIGS. 7A-7B and 10A. In some embodiments, user information component 108 may store user information within database 122.

Figure 8A:
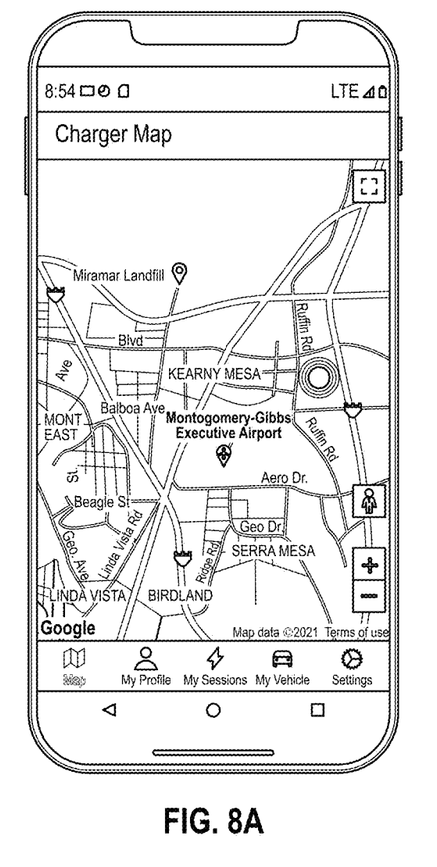
Figure 8B:
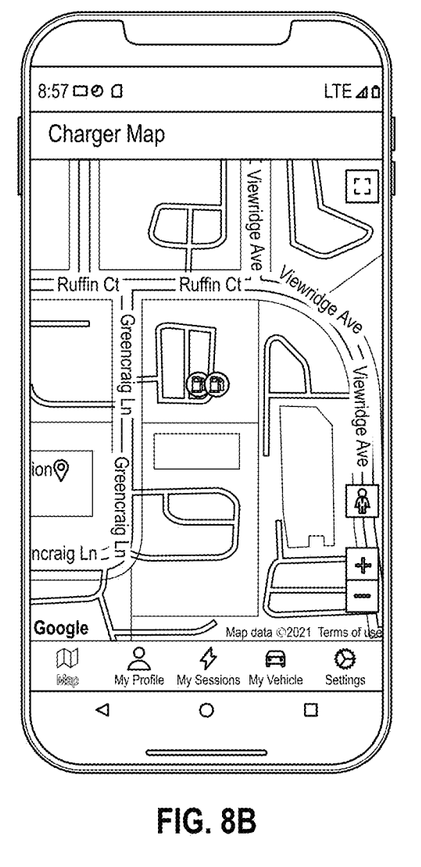
Figure 8C:
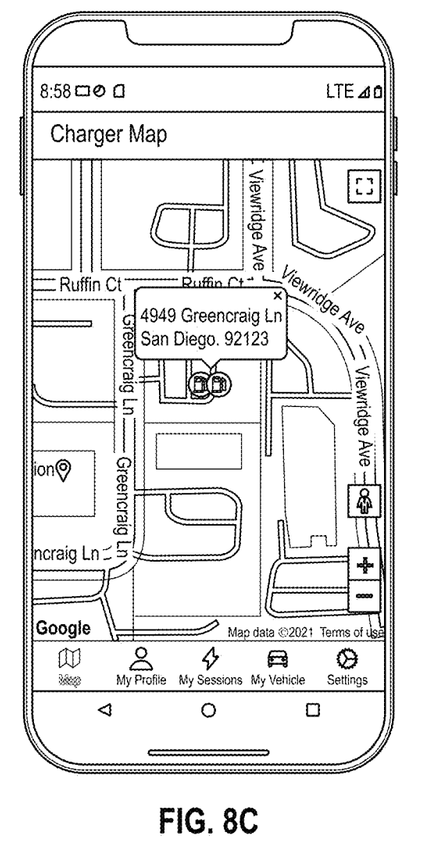

In some embodiments, location processing component 110 may be configured to process user input (e.g., user's preferred charging location) obtained by user information component 108 to present a map generated for the area showing one or more charging stations, as illustrated in FIGS. 8A-8C.

Referring back to FIG. 3, alternatively, location processing component 110 may be configured to process GPS location information associated with mobile device 104 when presenting the map generated for the area showing one or more charging stations.

Figure 9A:
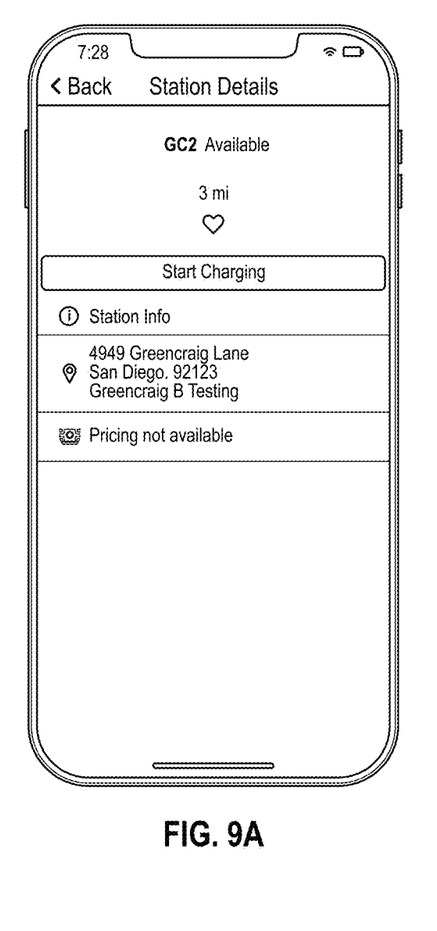
Figure 9B:
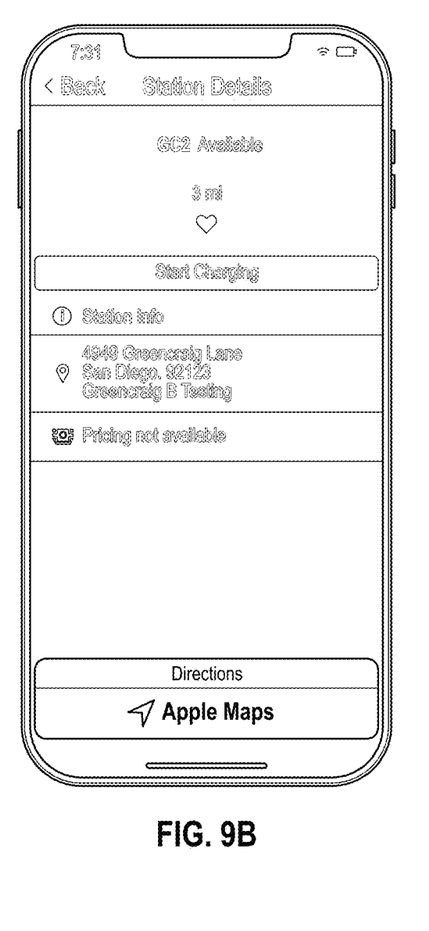
Figure 9C:
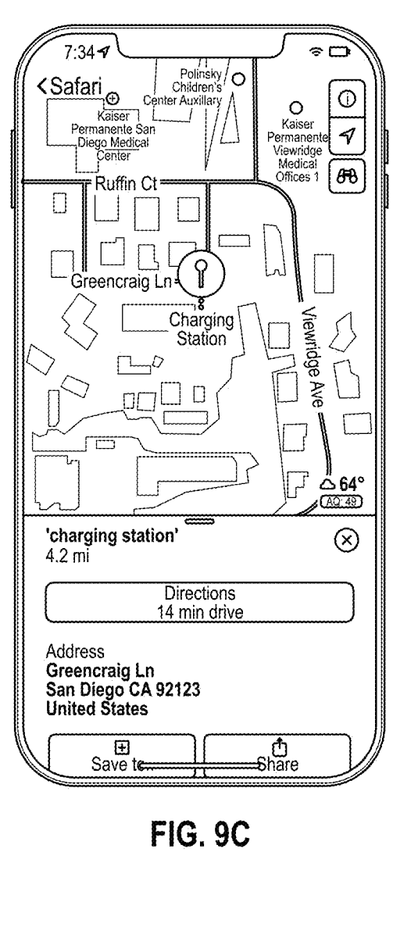

Additionally, location processing component 110 may be configured to present information associated with the charging station such as station name, address, directions, and pricing, as illustrated in FIGS. 9A-9C.

Figure 6:
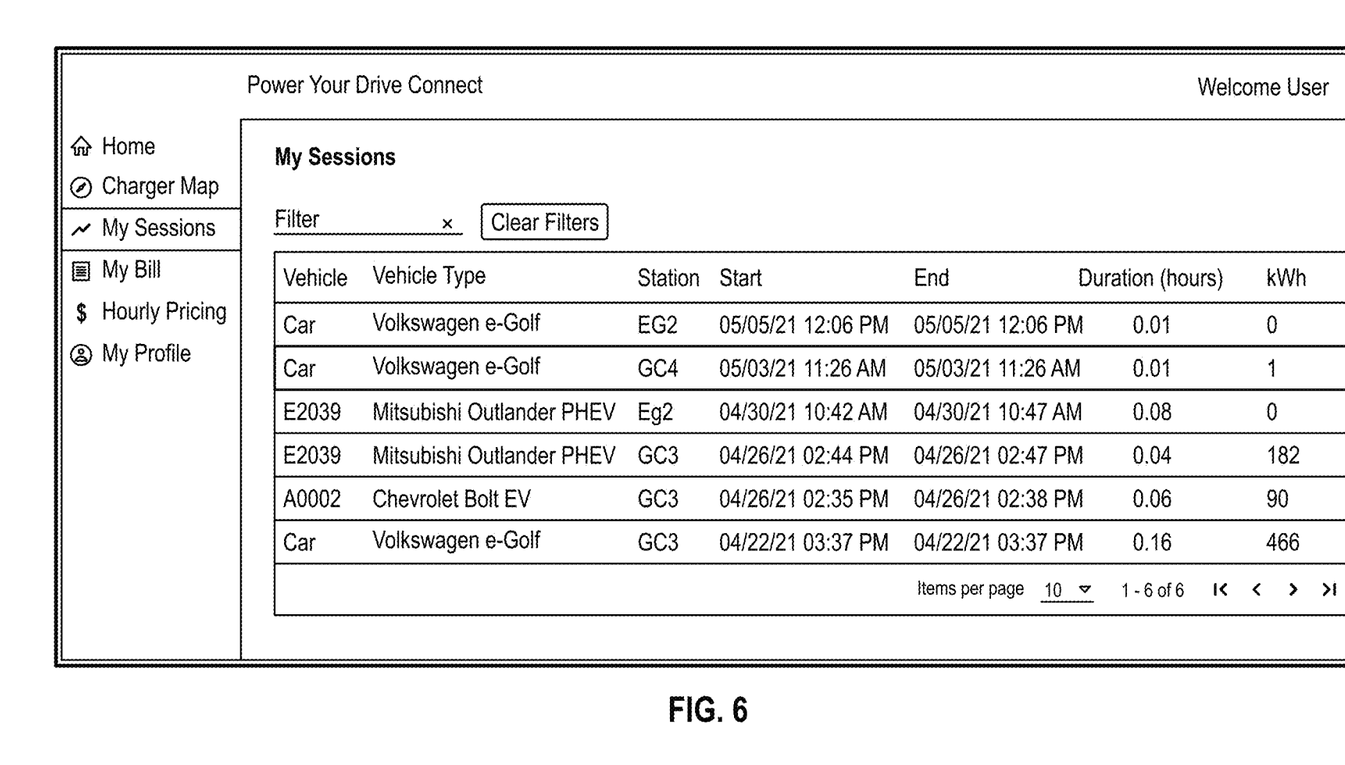
Figure 10B:
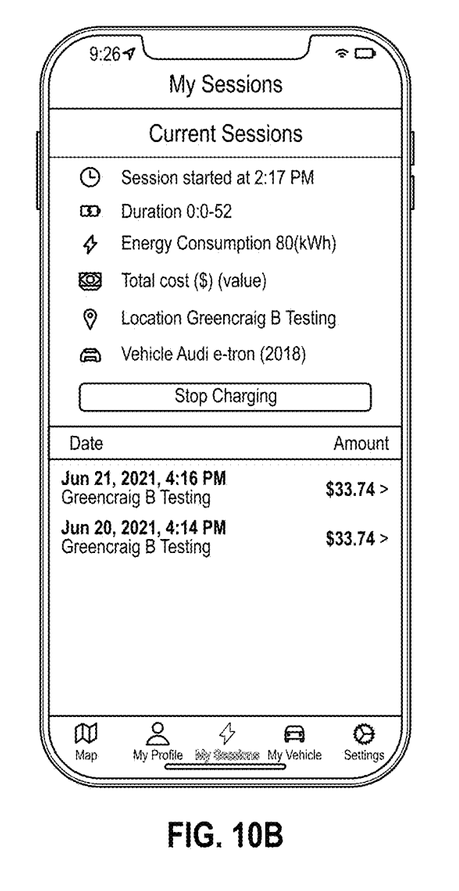

Referring back to FIG. 3, in some embodiments, billing component 112 may be configured to process meter data obtained from the ICM Smart Meter 102 and generate session data comprising a summary of the corresponding vehicle charging session. For example, as illustrated in FIG. 10B, client application 135 may display information such as charging session start time, duration, energy consumed, total cost, location, and the type of vehicle. In some embodiments, billing component 112 may be configured to provide a summary of all charging sessions for that user, at a plurality of charging stations at a plurality of locations. In other words, billing component 112 may be configured to process meter data from multiple Smart Meters for a particular user profile, for as illustrated in FIG. 6.

In some embodiments, billing component 112 of the Smart Meter Control system may be configured to identify any gaps in charging intervals by virtue of the one-to-one relationship between each charging session and each ICM Smart Meter 102.

In some embodiments, billing component 112 may be configured to record energy consumption after every fifteen-minute interval until the session is terminated.

In some embodiments, billing component 112 may be configured to identify irregular charging intervals. For example, intervals with negative kWh values or intervals with excessively large values In some embodiments, power flow control component 114 may be configured to effectuate disconnect or reconnect commands to ICM Smart Meter 102 thus terminating and starting the power flowing to the charge station 109. For example, user 129 may use Mobile Application 135 on their mobile device 104 when disconnecting or reconnecting to the ICM Smart Meter 102.

Figure 11:
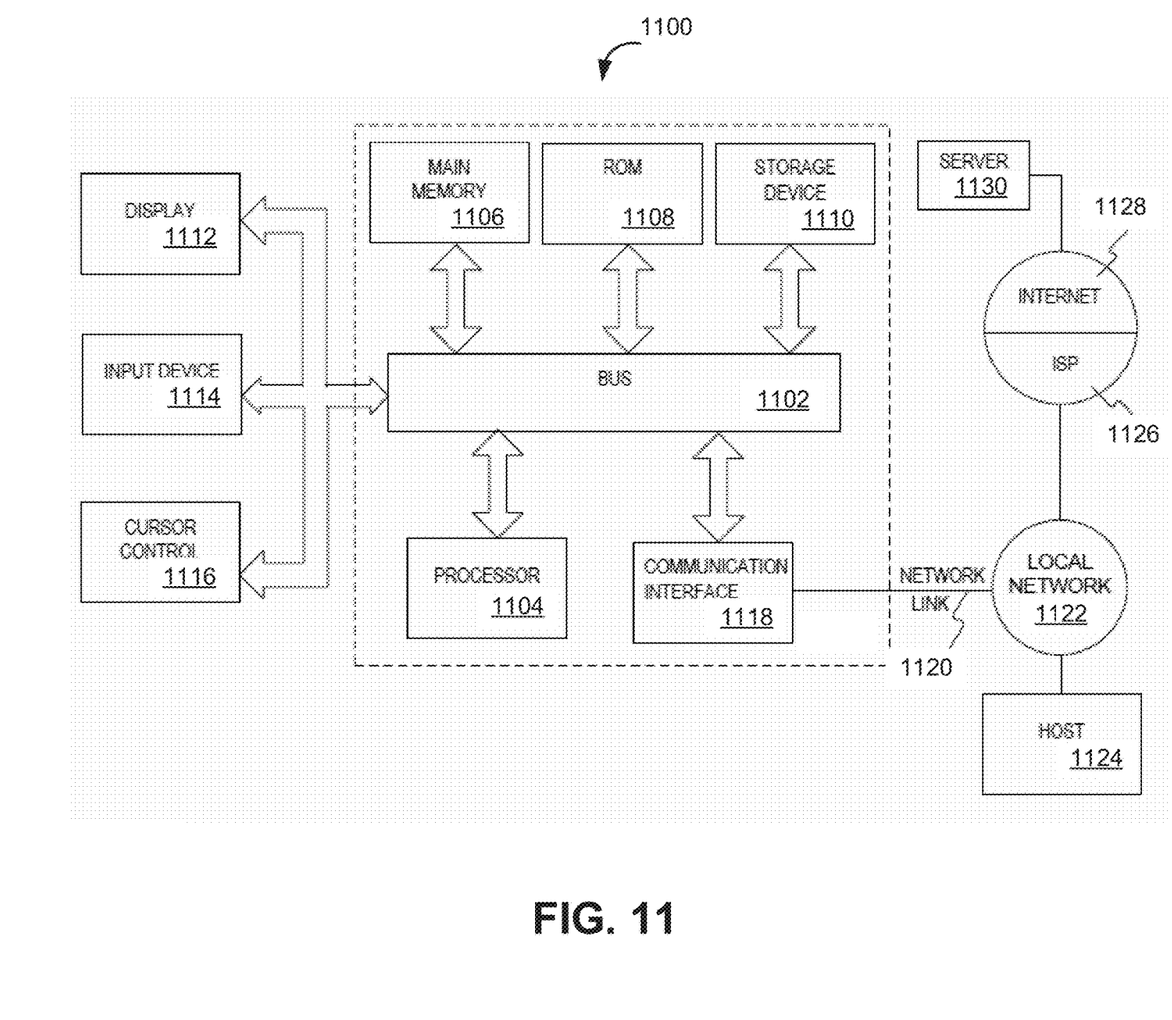
FIG. 11 illustrates example computing system that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that physically or electrically separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 1100. After reading this description, it will become apparent to a person skilled in the relevant art how to implement the technology using other computing modules or architectures.

FIG. 11 illustrates an example computing module 1100, an example of which may be a processor/controller resident on a mobile device, or a processor/controller used to operate a payment transaction device, that may be used to implement various features and/or functionality of the systems and methods disclosed in the present disclosure.

Computing module 1100 might include, for example, one or more processors, controllers, control modules, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of computing module 1100 or to communicate externally.

Computing module 1100 might also include one or more memory modules, simply referred to herein as main memory 1108. For example, preferably random-access memory (RAM) or other dynamic memory might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage devices 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage devices 1110 might include other similar instrumentalities for allowing computer programs or other instructions or data to be loaded into computing module 1100. Such instrumentalities might include, for example, a fixed or removable storage unit 1122 and a storage unit interface 1120. Examples of such storage units 1122 and storage unit interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 1100 might also include a communications interface 1124. Communications interface 1124 might be used to allow software and data to be transferred between computing module 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1108, storage unit interface 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for remotely managing electric power transfer, the system comprising:
    a power source;
    an external electric vehicle charging device configured to transfer electric power from the power source to an electric vehicle;
    a smart meter device comprising a first hard-wire connector coupling the smart meter device to the power source and a second hard-wired connector coupling the smart meter device to the external electric vehicle charging device, wherein the smart meter device is configured to couple the external electric vehicle charging device to the power source, and configured to control the electric power transferred to the electric vehicle by the external electric vehicle charging device by transmitting, via a wireless network, remote commands and electrical charging data to and from the external electric vehicle charging device respectively; and
    a smart meter control server communicatively coupled to the smart meter device, wherein the smart meter control server is configured to receive user commands transmitted, via a mobile network, from a mobile device operated by a user;
    wherein the smart meter control server is configured to remotely control the smart meter device by:
        transmitting a start command to the smart meter device in response to receiving a first user command from the user, wherein the start command causes the smart meter device to permit the external electric vehicle charging device to start the electric power transfer;
        transmitting a stop command to the smart meter device in response to receiving a second user command the user, wherein the stop command causes the smart meter device to prevent the external electric vehicle charging device from continuing the electric power transfer.

2. The system of claim 1, wherein the smart meter device is configured to communicate with the smart meter control server via a smart meter network.

3. The system of claim 2, wherein the smart meter device comprises a measurement module and a communication module.

4. The system of claim 3, wherein the measurement module of the smart meter device comprises a processor and a memory, the measurement module configured to collect and store voltage and current information associated with electric power transferred from the power source to the electric vehicle via the external electric vehicle charging device.

5. The system of claim 4, wherein the communication module of the smart meter device is configured to transmit the voltage and the current information collected by the measurement module.

6. The system of claim 4, wherein the measurement module of the smart meter device generates a data record for the electric power transferred from the power source to the electric vehicle via the external electric vehicle charging device, wherein the record is transmitted to the smart meter server by the communication module of the smart meter device.

7. The system of claim 6, wherein the smart meter control server is configured to determine electric power consumption by the electric vehicle based on the data record for the electric power transferred to the electric vehicle transmitted by the communication module of the smart meter device.

8. The system of claim 7, wherein the smart meter control server determines a total cost for charging the electric vehicle based on the electric power consumption determination.

9. A method for remotely managing electric power transfer, the method comprising:
providing an external electric vehicle charging device coupled to a power source, wherein the external electric vehicle charging device is configured to transfer electric power from the power source to an electric vehicle;
coupling a smart meter device to the external electric vehicle charging device via a first hard-wire connector on one end and the power source via a second hard-wired connector on another end;
communicatively coupling the smart meter device to a smart meter control server, wherein the smart meter control server is configured to receive user commands transmitted, via a mobile network, from a mobile device operated by a user; and
remotely controlling the electric power being transferred by the external electric vehicle charging device by:
transmitting a start command from the smart meter control server to the smart meter device in response to the smart meter control server receiving a first user command from the user, wherein the start command causes the smart meter device to permit the external electric vehicle charging device to start the electric power transfer;
transmitting a stop command from the smart meter control server to the smart meter device in response to the smart meter control server receiving a second user command the user, wherein the stop command causes the smart meter device to prevent the external electric vehicle charging device from continuing the electric power transfer.

10. The method of claim 9, further comprising communicating, by the smart meter device, with the smart meter control server, via a smart meter network.

11. The method of claim 10, wherein the smart meter device comprises a measurement module and a communication module.

12. The method of claim 11, wherein controlling the electric power comprises collecting and storing voltage and current information associated with electric power transferred from the power source to the electric vehicle via the external electric vehicle charging device by a measurement module of the smart meter device.

13. The method of claim 12, wherein the voltage and the current information collected by the measurement module is transmitted to the smart meter control server by a communication module of the smart meter device.

14. The method of claim 12, wherein the measurement module of the smart meter device generates a data record for the electric power transferred from the power source to the electric vehicle via the external electric vehicle charging device, wherein the record is transmitted to the smart meter server by the communication module of the smart meter device.

15. The method of claim 12, further comprising determining, by the smart meter control server, electric power consumption by the electric vehicle information based on the data record for the electric power transferred to the electric vehicle transmitted by the communication module of the smart meter device.

16. The method of claim 15, further comprising determining, by the smart meter control server, a total cost for charging the electric vehicle based on the electric power consumption determination.

* * * * *